(12) United States Patent
Chiang

(10) Patent No.: US 12,479,617 B2
(45) Date of Patent: Nov. 25, 2025

(54) TAIL SEALING METHOD OF TUBE CONTAINER AND A PRODUCT THEREOF

(71) Applicant: XIAMEN BONMART MACHINERY AND PLASTIC CO., LTD., Fujian (CN)

(72) Inventor: Chih-Jung Chiang, Fujian (CN)

(*) Notice: Subject to any disclaimer, the term of this patent is extended or adjusted under 35 U.S.C. 154(b) by 166 days.

(21) Appl. No.: 18/388,538

(22) Filed: Nov. 10, 2023

(65) Prior Publication Data

US 2024/0174399 A1 May 30, 2024

(30) Foreign Application Priority Data

Nov. 24, 2022 (CN) .......................... 202211484981.2

(51) Int. Cl.
*B65B 61/06* (2006.01)
*B65B 7/14* (2006.01)
*B65D 35/16* (2006.01)

(52) U.S. Cl.
CPC ................ *B65B 61/06* (2013.01); *B65B 7/14* (2013.01); *B65D 35/16* (2013.01)

(58) Field of Classification Search
CPC ........... B65B 61/06; B65B 7/14; B65D 35/16; B65D 35/08; B65D 35/14;
(Continued)

(56) References Cited

U.S. PATENT DOCUMENTS 3,306,500 A * 2/1967 Williams ............... B65D 35/24
222/386.5

3,894,381 A * 7/1975 Christine .......... B29C 66/83411
53/410
(Continued)

FOREIGN PATENT DOCUMENTS

CN 205381466 U * 7/2016
EP 0275396 A1 * 7/1988 ............. B29C 65/58
(Continued)

*Primary Examiner* — Donnell A Long
(74) *Attorney, Agent, or Firm* — Birchwood IP

(57) ABSTRACT

A tail sealing method of a tube container and a product thereof, which achieves tail sealing and covering of an end surface of a mid-layer material of the tube container at the same time, so as to protect the mid-layer material. The tail sealing method includes the steps of: (1): placing a tube body into a tail sealing machine; aligning a left mold and a right mold of the tail sealing machine with an end opening of a tube tail of the tube body, and then closing the left mold and the right mold against each other; surfaces of the left mold and the right mold opposite to each other are each provided with a pressing portion, which is configured to press against the end opening of the tube tail of the tube body; a first protruding edge is horizontally arranged along a lower edge of each pressing portion; (2) fusing two sides of the end opening of the tube tail of the tube body together with high pressure by the left mold and the right mold of the tail sealing machine; an overflow portion is formed at a tail portion of the tube tail by melted material of the tube body pushed towards the tail portion of the tube tail by the first protruding edges; (3) after cooling the tube tail, trimming the overflow portion at the tail portion of the tube tail with a cutter, thus completing a tail sealing process; wherein the cutter performs cutting at a position higher than an end of the tube body corresponding to the tube tail.

6 Claims, 11 Drawing Sheets

(58) Field of Classification Search
CPC .............. B29C 66/43123; B29C 65/18; B29C 66/0342; B29C 66/0346; B29D 23/00
See application file for complete search history.

(56) References Cited

U.S. PATENT DOCUMENTS

| | | | | |
|---|---|---|---|---|
| 3,966,524 | A * | 6/1976 | Lehmacher | B29C 66/80 206/390 |
| 5,547,091 | A * | 8/1996 | Neveras | B65D 47/0814 222/545 |
| 6,523,325 | B1 * | 2/2003 | Forman | B65D 33/25 493/212 |
| 2009/0263050 | A1 * | 10/2009 | Eberhardt | B29C 66/0222 53/551 |
| 2017/0158364 | A1 * | 6/2017 | Honda | B29C 65/7882 |

FOREIGN PATENT DOCUMENTS

| | | | | |
|---|---|---|---|---|
| EP | 0508168 A1 * | 10/1992 | | B65D 35/14 |
| WO | WO-8504849 A1 * | 11/1985 | | B29C 66/73921 |

* cited by examiner

TAIL SEALING METHOD OF TUBE CONTAINER AND A PRODUCT THEREOF

FIELD OF THE INVENTION

The present invention relates to the field of tube container processing technology, and more particularly a tail sealing method of a tube container and a product thereof.

BACKGROUND OF THE INVENTION

A tail sealing method in the prior art comprises the steps of first injecting contents (e.g. cosmetics, toothpaste, etc.) into a tube container, and then fusing two sides of an end opening of the tube container together under high pressure by heating techniques; tail sealing of the tube container is completed after trimming uneven overflown fusing materials formed at an end of a tube tail of the tube container with a cutter.

Due to the improving technology in the industry and the ever-changing product demands, materials currently used to make tube containers are no longer limited to plastics, but a growing variety of raw materials; for instance, some manufacturers have begun to make tube bodies using eco-friendly paper, which is more environmentally friendly by reducing the amount of plastic used. As illustrated in FIGS. 1-2, a tube body 11' made of eco-friendly paper comprises at least a first plastic film 111' as an outermost layer thereof, a second plastic film 112' (or aluminum foil) as an innermost layer thereof, and an eco-friendly paper layer 113' in between the first plastic film 111' and the second plastic film 112'; when the tail sealing method in the prior art is adopted, after trimming the uneven overflown fusing materials formed at an end portion of a tube tail 12' (consisting of a heat fusing portion and an overflown fusing material portion), an end of the eco-friendly paper layer 113' is directly exposed from the tube tail 12'. As tube containers are commonly filled with cosmetics, toothpaste and so on, which are usually used and stored in bathrooms or other humid environments, an exposed end of the eco-friendly paper layer 113' is prone to be affected by humidity; subsequently, the eco-friendly paper layer 113' inside the tube body 11' may become dampened, discolored and even deteriorated, thus causing worsen quality of the tube container of which the tube tail may easily split; meanwhile, the eco-friendly paper layer 113' being dampened and discolored also affects the appearance of the tube container, and leads to poor user's experience.

BRIEF SUMMARY OF THE INVENTION

It is an object of the present invention to provide a tail sealing method of a tube container and a product thereof, which achieves tail sealing and covering of an end surface of a mid-layer material of the tube container at the same time, so as to protect the mid-layer material.

To attain the above object, the first technical solution of the present invention is as follows:

A tail sealing method of a tube container; comprising the steps of:
 step 1: placing a tube body into a tail sealing machine; aligning a left mold and a right mold of the tail sealing machine with an end opening of a tube tail of the tube body, and then closing the left mold and the right mold against each other; surfaces of the left mold and the right mold opposite to each other are each provided with a pressing portion, which is configured to press against the end opening of the tube tail of the tube body; a first protruding edge is horizontally arranged along a lower edge of each pressing portion;

step 2: fusing two sides of the end opening of the tube tail of the tube body together with high pressure by the left mold and the right mold of the tail sealing machine; an overflow portion is formed at a tail portion of the tube tail by melted material of the tube body pushed towards the tail portion of the tube tail by the first protruding edges;

step 3: after cooling the tube tail, trimming the overflow portion at the tail portion of the tube tail with a cutter, thus completing a tail sealing process; wherein the cutter performs cutting at a position higher than an end of the tube body corresponding to the tube tail.

A second protruding edge is horizontally arranged along an upper edge of each pressing portion.

Preferably, a position of each second protruding edge is higher than said end of the tube body corresponding to the tube tail; and each second protruding edge defines a stepped portion formed on each of two sides of the tube tail; the stepped portions positions and guides the cutter.

In step 3, said position at which the cutter performs cutting is at half of a height of the overflow portion.

The present invention also provides a second technical solution:

A tube container, made according to the tail sealing method as described above; wherein the tube body of the tube container comprises a plastic film layer as an outermost layer thereof, an anti-corrosion layer as an innermost layer thereof, and an eco-friendly paper layer in between the plastic film layer and the anti-corrosion layer; the tube tail has an end of the eco-paper layer being covered.

The anti-corrosion layer is a plastic film or an aluminum foil.

By adopting the above technical solutions, the beneficial effects of the present invention are as follows:

1. The left mold and the right mold of the tail sealing machine of the present invention are each provided with a first protruding edge; the first protruding edges push melted material of an outer layer of the tube body to overflow towards the tail portion of the tube tail during a high-pressure fusing process; then, the overflow portion is formed on the tail portion of the tube tail to cover an end surface of the eco-friendly paper layer; therefore, the eco-friendly paper layer inside the tube body is insulated and protected from an external environment.

2. The tube tail as formed has a positioning and directing function during cutting, which avoids the eco-friendly paper layer of the tube body from being cut or exposed after the cutting process, thereby protecting the eco-friendly paper layer from humidity when in use.

3. The present invention does not require modifications of an existing forming method of the tube body, nor extra amounts of material for the tube body shall be used; instead, the first protruding edges of the present invention reshape a part of the material of the tube body to form the overflow portion of the tube tail, thus the present invention can be directly used to complete a tail sealing process of existing tube containers made of multilayer composite materials.

DETAILED DESCRIPTION OF THE INVENTION

Figure 1:
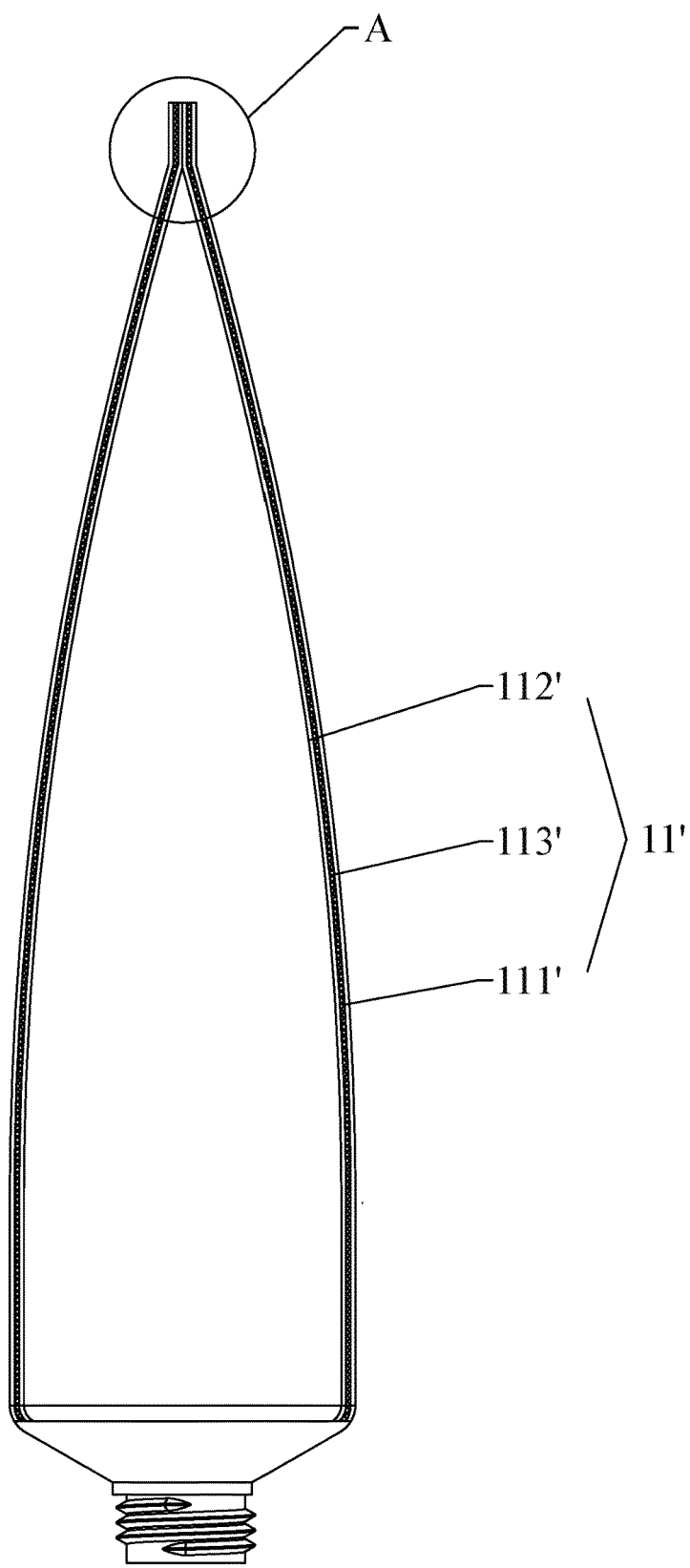
FIG. 1 is a structural view of a tube container in the prior art which contains eco-friendly paper.
Figure 2:
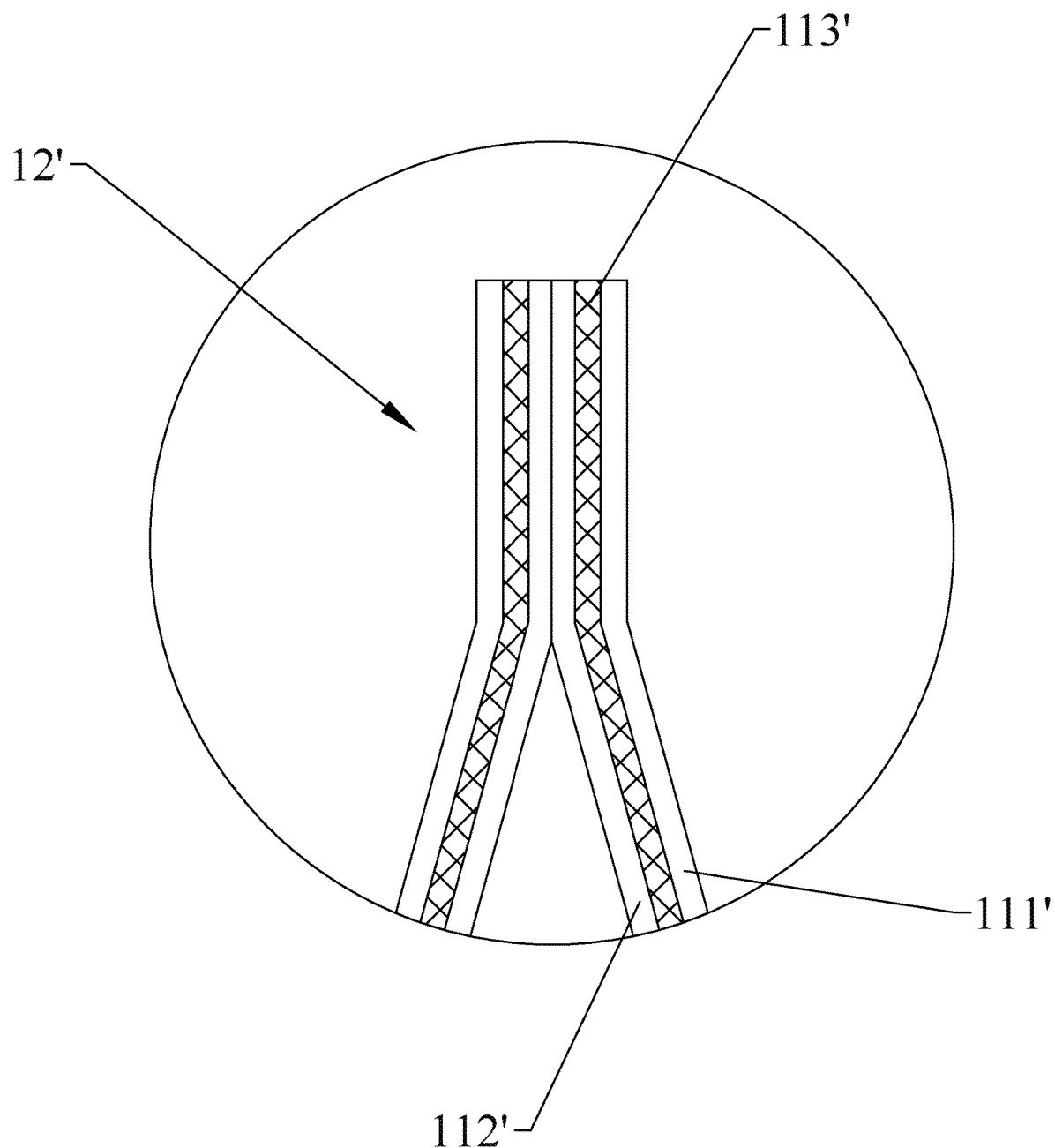
FIG. 2 shows an enlarged view of part A of FIG. 1.
Figure 3:
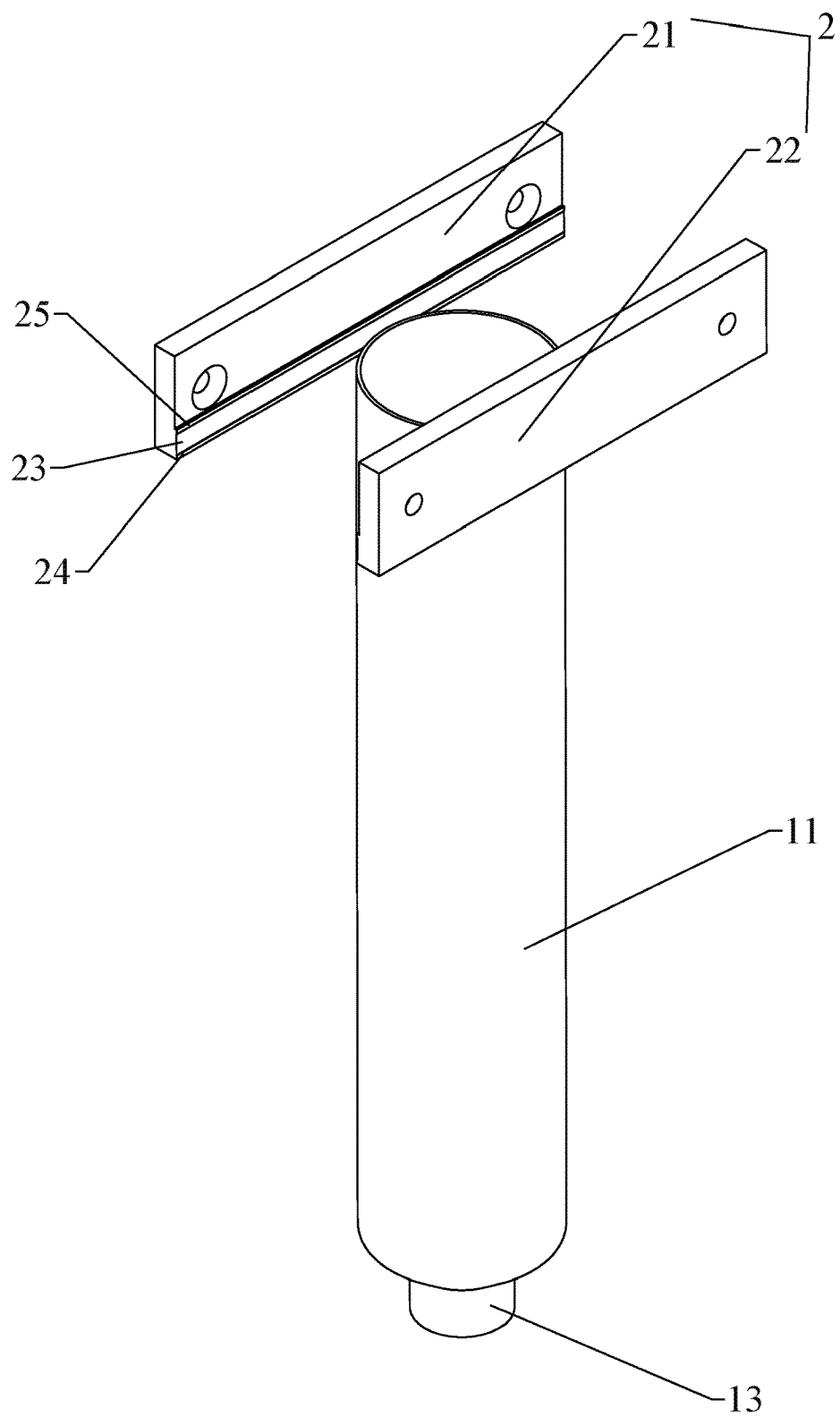
FIG. 3 shows a perspective view of an embodiment of the tail sealing method of the present invention before a mold closing process.
Figure 4:
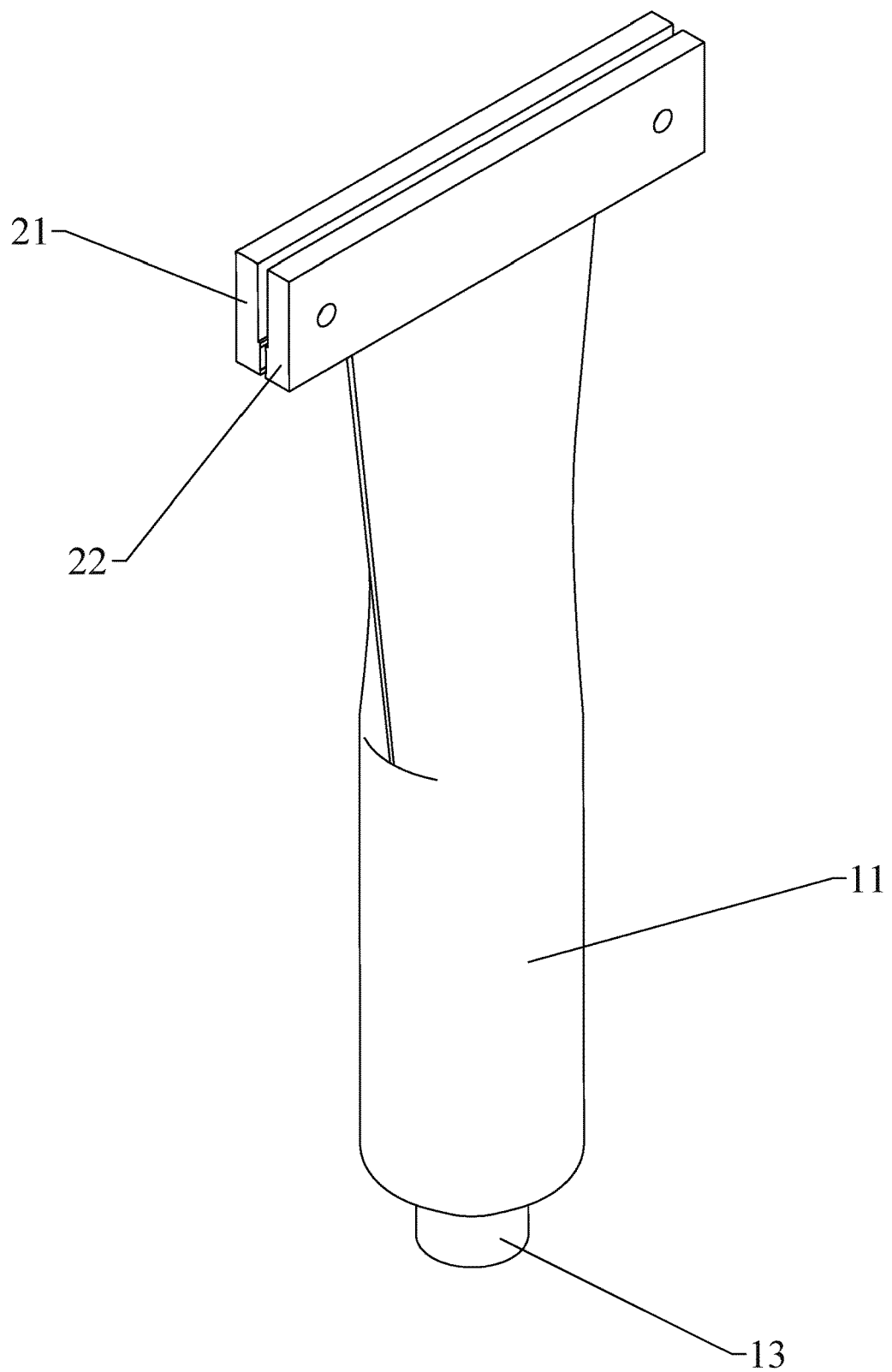
FIG. 4 shows a perspective view of an embodiment of the tail sealing method of the present invention after a mold closing process.
Figure 5:
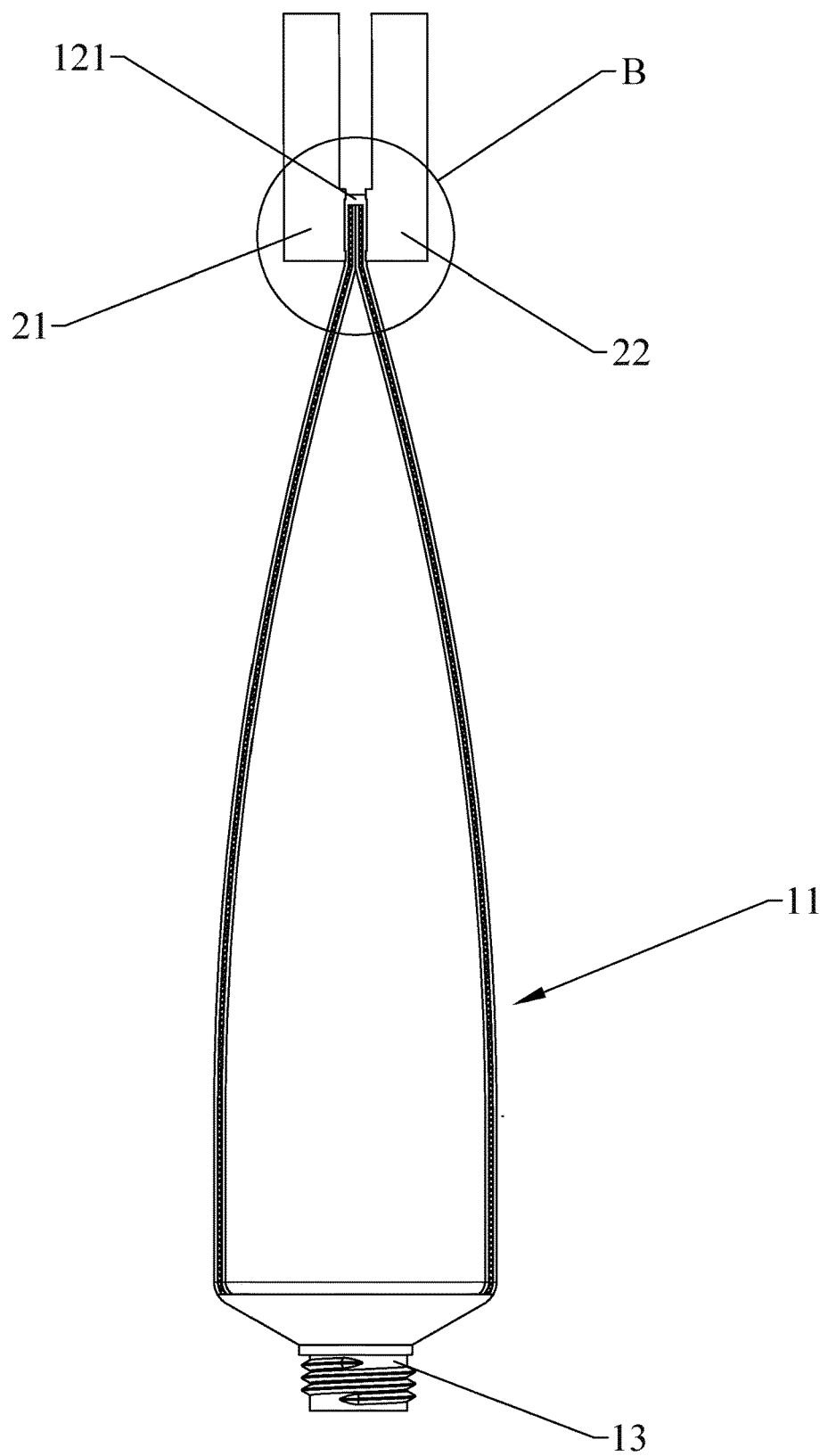
FIG. 5 shows a structural view of an embodiment of the tail sealing method of the present invention after a mold closing process.
Figure 6:
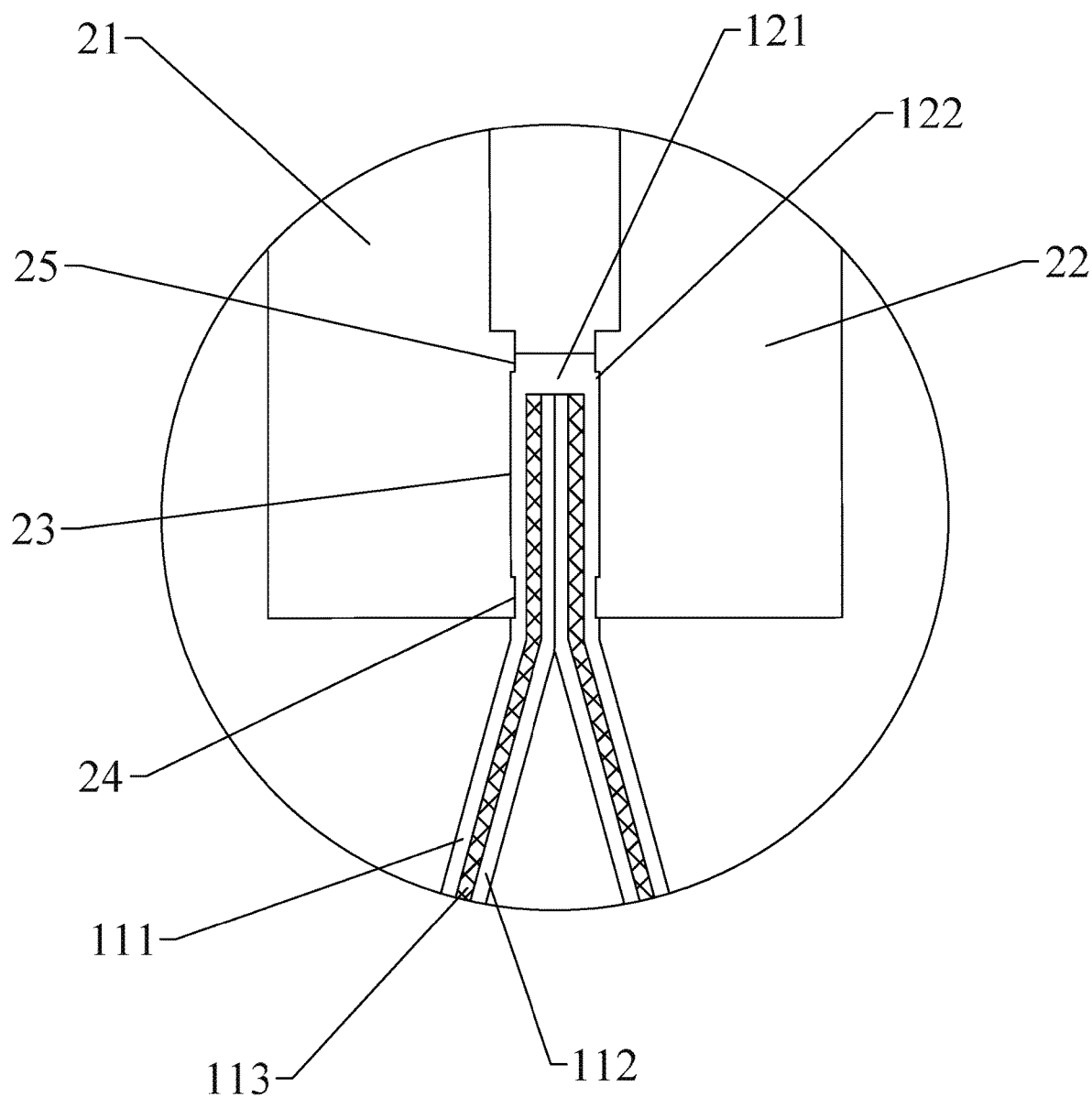
FIG. 6 shows an enlarged view of part B of FIG. 5.
Figure 7:
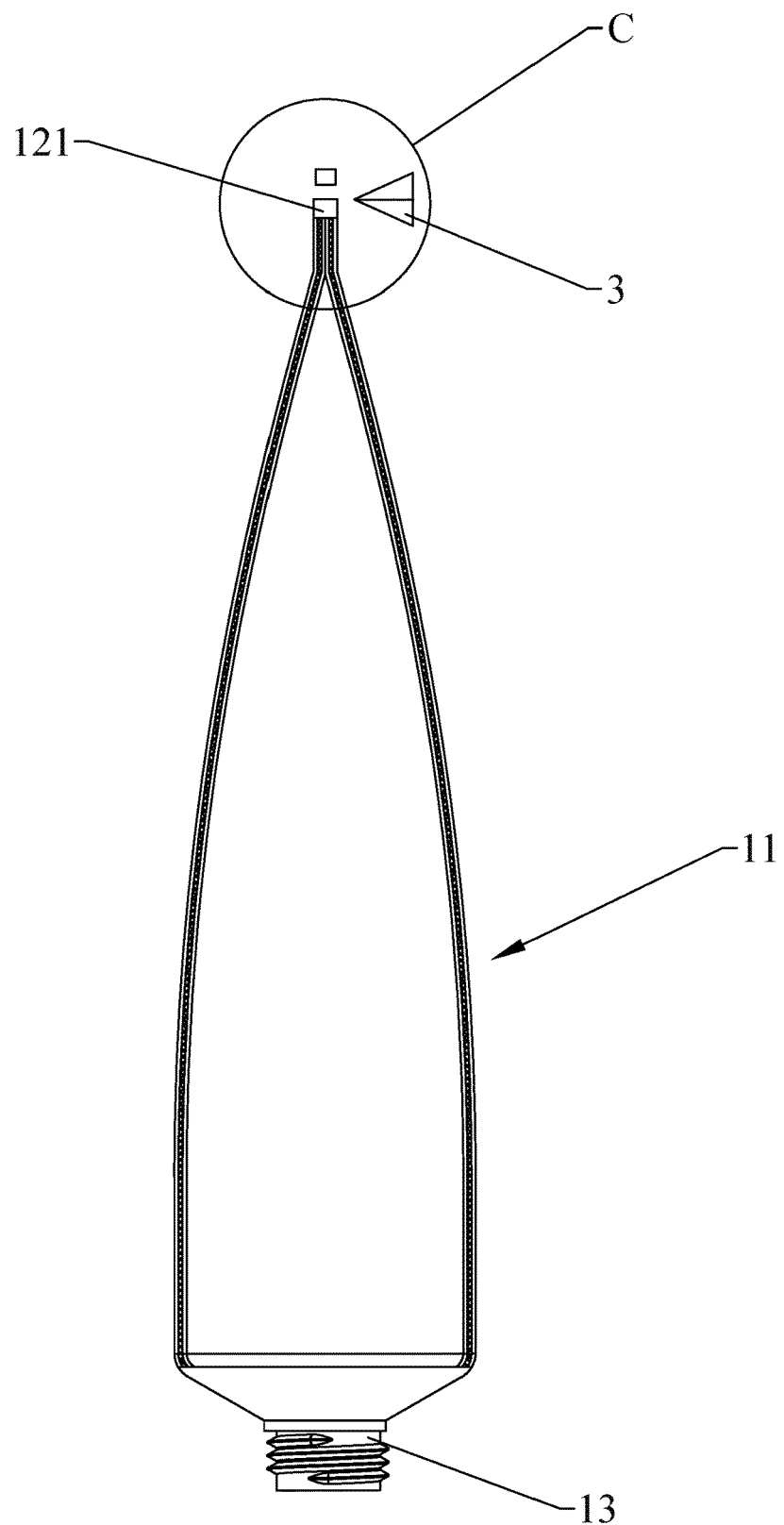
FIG. 7 shows a structural view of an embodiment of the tail sealing method of the present invention during a cutting process.
Figure 8:
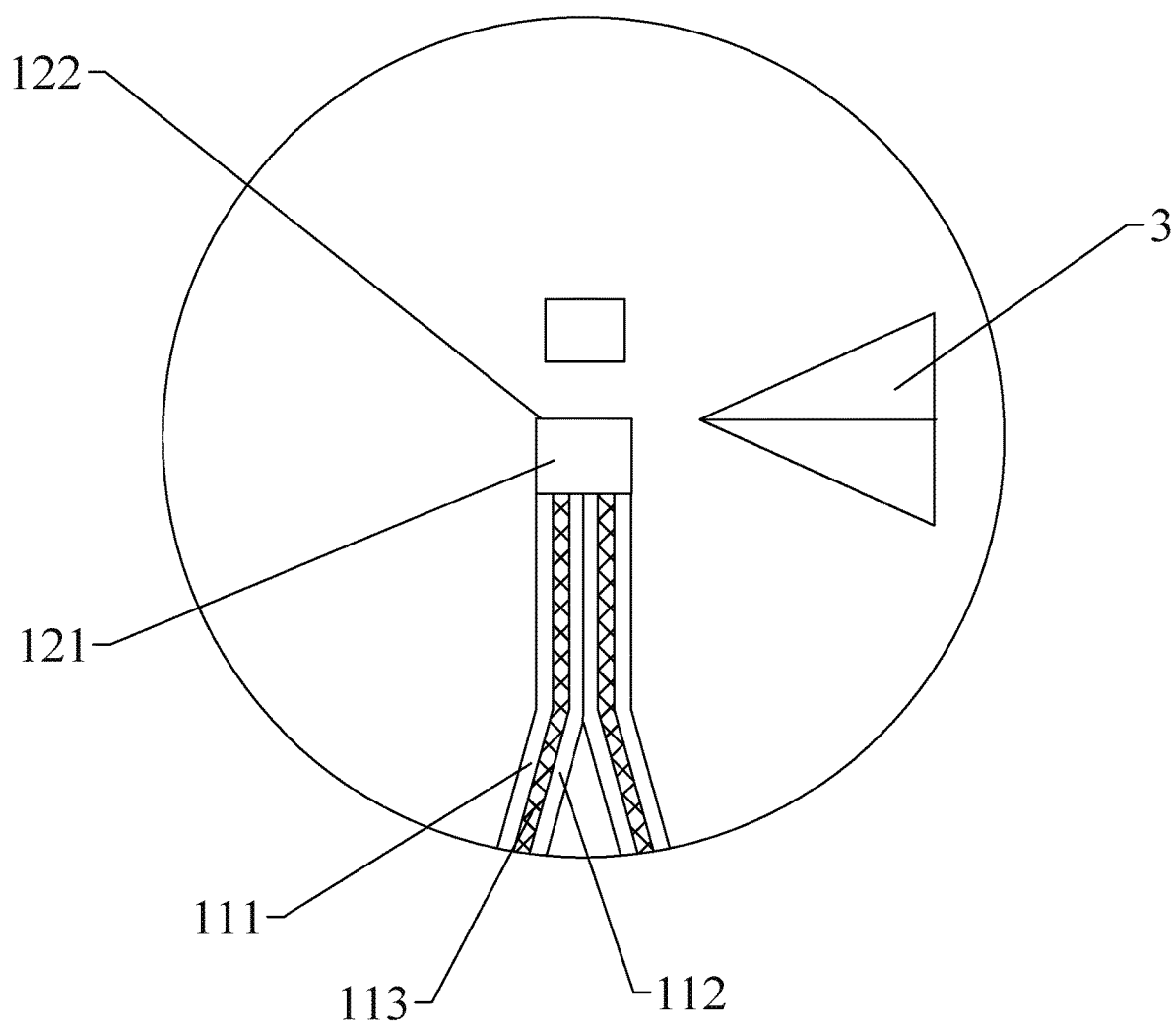
FIG. 8 shows an enlarged view of part C of FIG. 7.
Figure 9:
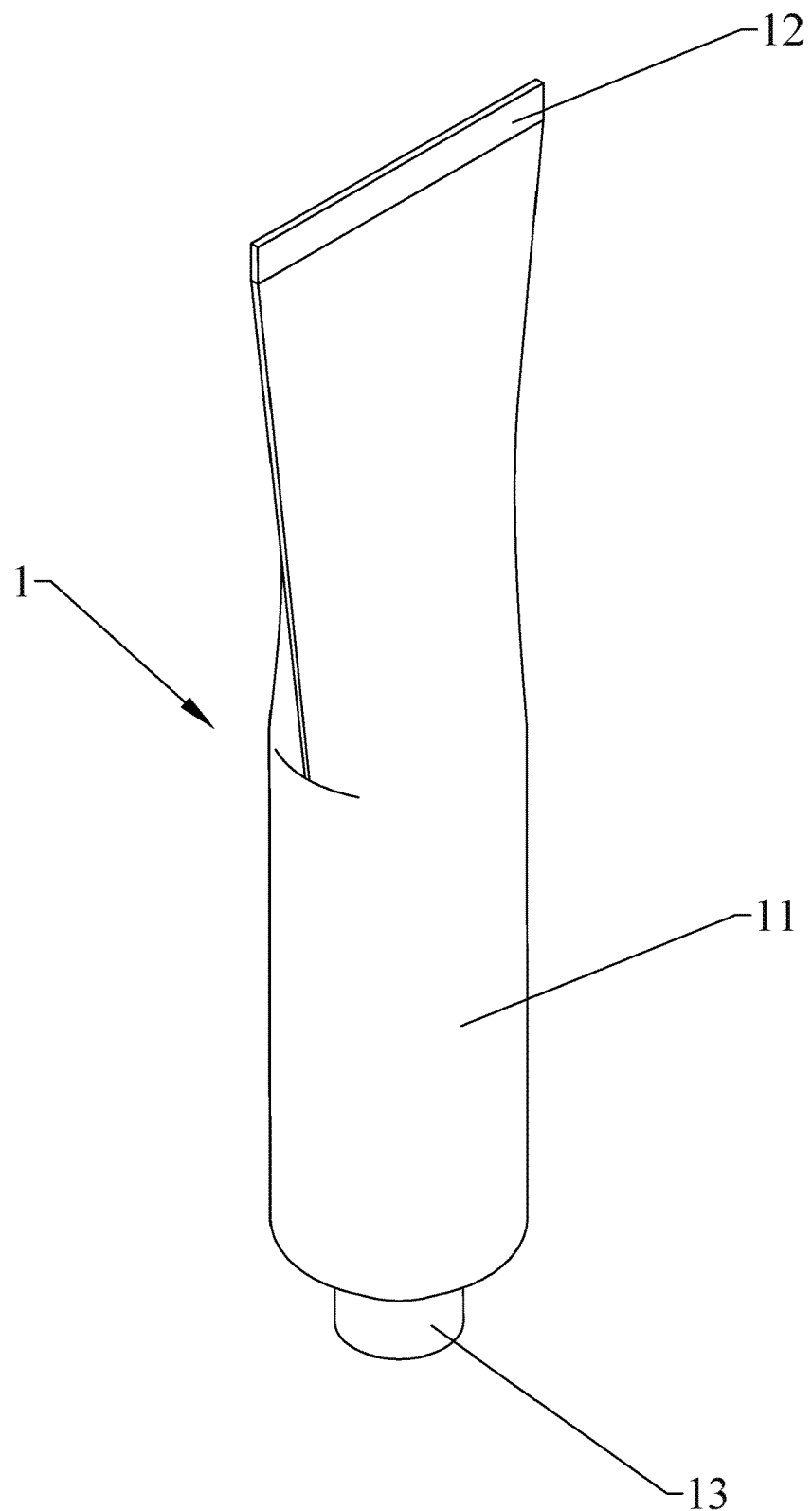
FIG. 9 shows a perspective view of an embodiment of a product of the tail sealing method of the present invention.

As illustrated in FIGS. 3-11, the present invention discloses a tail sealing method of a tube container, comprising the following steps:

Step 1: as illustrated in FIGS. 3-4, placing a tube body 11 formed with a tube head 13 and filled with contents into a tail sealing machine 2; aligning a left mold 21 and a right mold 22 of the tail sealing machine 2 with an end opening of the tube body 11 opposite to an end of the tube body 11 formed with the tube head 13, and then closing the left mold 21 and the right mold 22 against each other; surfaces of the left mold 21 and the right mold 22 opposite to each other are each provided with a pressing portion 23, which is configured to press against the end opening of the tube body 11; a first protruding edge 24 is horizontally arranged along a lower edge of each pressing portion 23;

Step 2: as illustrated in FIGS. 5-6, fusing two sides of the end opening of the tube body 11 together with high pressure by the left mold 21 and the right mold 22 of the tail sealing machine 2; an overflow portion 121 is formed at a tail portion of a tube tail 12 by melted material of the tube body 11 pushed towards the tail portion of the tube tail 12 by the first protruding edges 24;

Step 3: as illustrated in FIGS. 7-8, after cooling the tube tail 12, trimming the overflow portion 121 at the tail portion of the tube tail 12 with a cutter 3, thus completing a tail sealing process and obtaining a tube container 1 as illustrated in FIG. 9; wherein the cutter 3 performs cutting at a position higher than an end of the tube body 11 opposite to the end of the tube body 11 formed with the tube head 13.

Embodiments of the present invention are as follows:

A second protruding edge 25 is horizontally arranged along an upper edge of each pressing portion 23; the second protruding edge 25 is provided to increase a height of the overflow portion 121 formed after the tube body 11 is pressed by the left mold 21 and the right mold 22, so that it is more convenient for the cutting performed in step 3, while allowing higher degrees of fault tolerance during cutting and preventing defects of products.

Furthermore, a position of each second protruding edge 25 is higher than said end of the tube body 11 opposite to the end of the tube body 11 formed with the tube head 13; and each second protruding edge 25 defines a stepped portion 122 formed on each of two sides of the tube tail 12; the stepped portions 122 are convenient for positioning and guiding the cutter 3, thus increasing the efficiency and precision of the cutting performed by the cutter 3.

In step 3, said position at which the cutter 3 performs cutting is at half of a height of the overflow portion 121.

Figure 10:
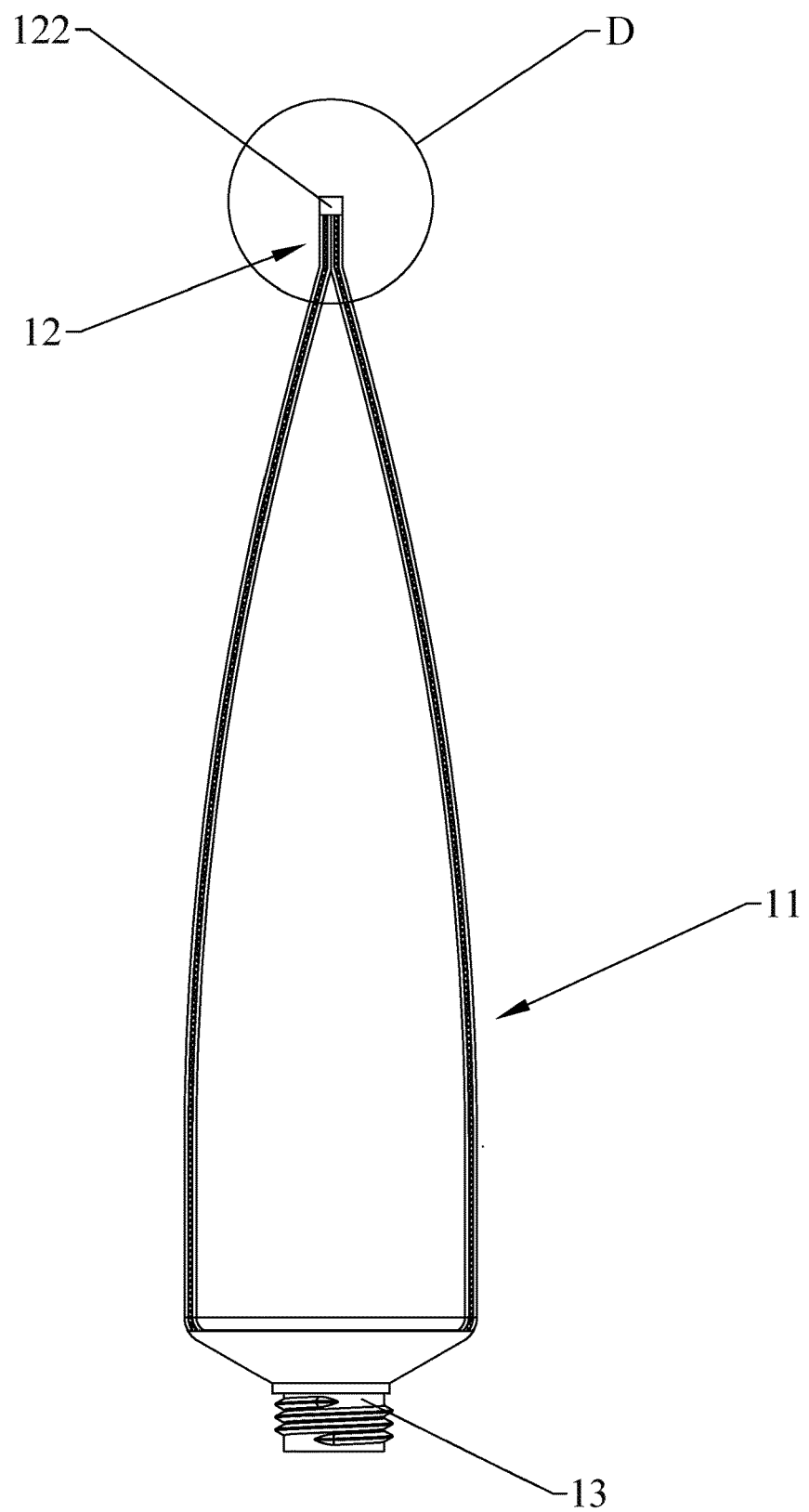
FIG. 10 shows a structural view of an embodiment of the product of the tail sealing method of the present invention.
Figure 11:
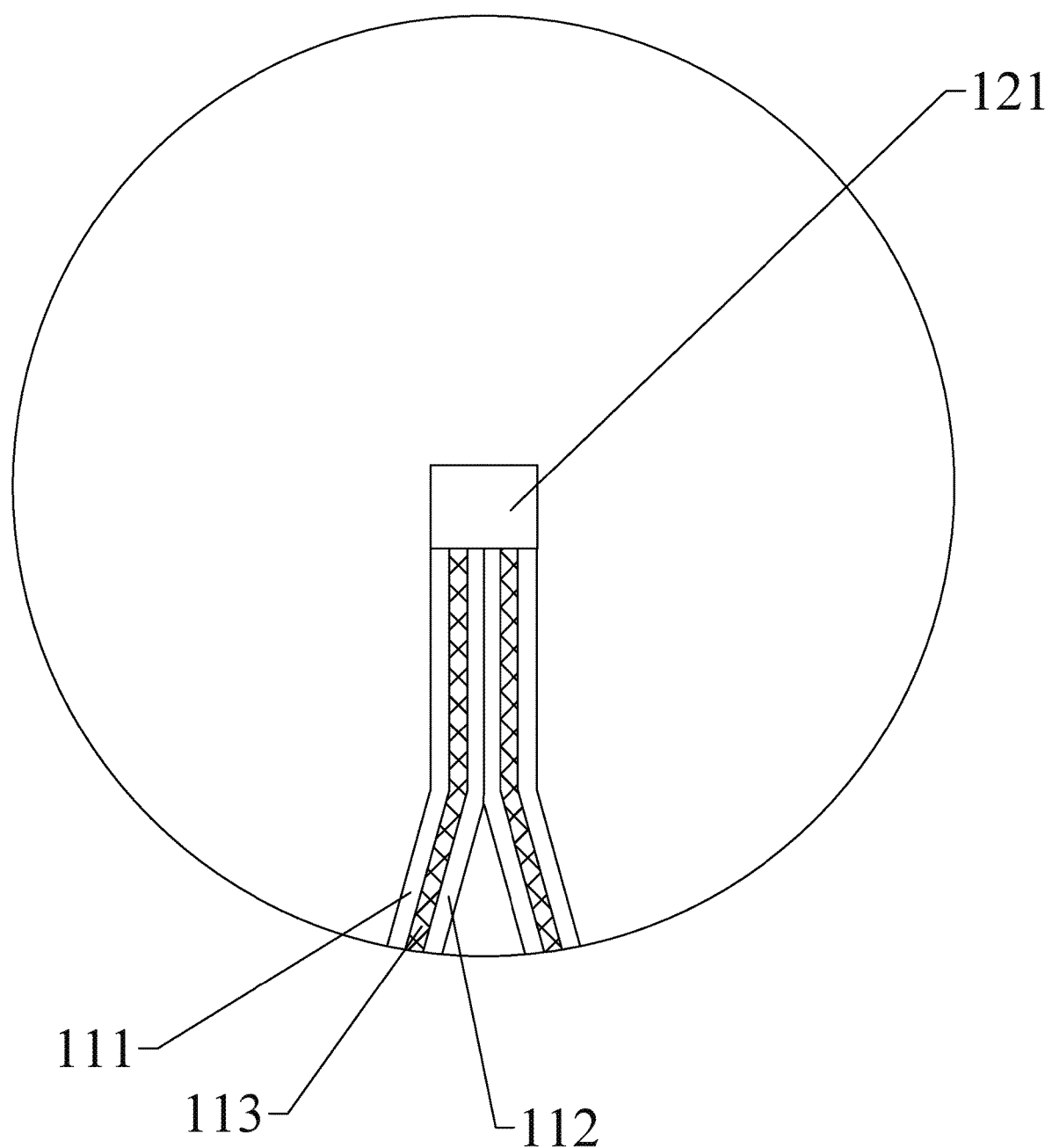
FIG. 11 shows an enlarged view of part D of FIG. 10.

As illustrated in FIGS. 9-11, a product of the tail sealing method is a tube container 1; the tube body 11 of the tube container 1 comprises a plastic film layer 111 as an outermost layer thereof, an anti-corrosion layer 112 as an innermost layer thereof, and an eco-friendly paper layer 113 in between the plastic film layer 111 and the anti-corrosion layer 112; the tube tail 12 has an end of the eco-paper layer 113 being covered.

Furthermore, the anti-corrosion layer 112 is a plastic film or an aluminum foil.

Furthermore, the tube body 11 is not limited to three layers of materials; the eco-friendly paper layer 113 comprises at least one layer of eco-friendly paper; or, the eco-friendly paper layer 113 can be other materials that require anti-corrosion and moisture-proof protection.

Through the above solutions, the left mold 21 and the right mold 22 of the tail sealing machine 2 of the present invention are each provided with a first protruding edge 24; the first protruding edges 24 push melted material of an outer layer of the tube body 11 to overflow towards the tail portion of the tube tail 12 during a high-pressure fusing process; then, the overflow portion 121 is formed at the tail portion of the tube tail 12 to cover an end surface of the eco-friendly paper layer 113; therefore, the eco-friendly paper layer 113 inside the tube body 11 is insulated and protected from an external environment; the tube tail 12 as formed has a positioning and directing function during cutting, which avoids the eco-friendly paper layer 113 of the tube body 11 from being cut or exposed after the cutting process, thereby protecting the eco-friendly paper layer 113 from humidity when in use; the present invention does not require modifications of an existing forming method of the tube body 11, nor extra amounts of material for the tube body 11 shall be used; instead, the first protruding edges 24 of the present invention reshape a part of the material of the tube body 11 to form the overflow portion 121 of the tube tail 12, thus the present invention can be directly used to complete a tail sealing process of existing tube containers made of multi-layer composite materials.

The invention claimed is:

1. A tail sealing method of a tube container; comprising the steps of:

step 1: placing a tube body into a tail sealing machine; aligning a left mold and a right mold of the tail sealing machine with an end opening of a tube tail of the tube body, and then closing the left mold and the right mold against each other; surfaces of the left mold and the right mold opposite to each other are each provided with a pressing portion, which is configured to press against the end opening of the tube tail of the tube body; a first protruding edge is horizontally arranged along a lower edge of each pressing portion;

step 2: fusing two sides of the end opening of the tube tail of the tube body together with high pressure by the left mold and the right mold of the tail sealing machine; an overflow portion is formed at a tail portion of the tube tail by melted material of the tube body pushed towards the tail portion of the tube tail by the first protruding edges;

step 3: after cooling the tube tail, trimming the overflow portion at the tail portion of the tube tail with a cutter, thus completing a tail sealing process; wherein the cutter performs cutting at a position higher than an end of the tube body corresponding to the tube tail.

2. The tail sealing method of claim 1, wherein a second protruding edge is horizontally arranged along an upper edge of each pressing portion.

3. The tail sealing method of claim 2, wherein a position of each second protruding edge is higher than said end of the tube body corresponding to the tube tail; and each second protruding edge defines a stepped portion formed on each of two sides of the tube tail; the stepped portions positions and guides the cutter.

4. The tail sealing method of claim 1, wherein in step 3, said position at which the cutter performs cutting is at half of a height of the overflow portion.

5. A tube container, made according to the tail sealing method according to claim 1; wherein the tube body of the tube container comprises a plastic film layer as an outermost layer thereof, an anti-corrosion layer as an innermost layer thereof, and an eco-friendly paper layer in between the plastic film layer and the anti-corrosion layer; the tube tail has an end of the eco-paper layer being covered.

6. The tube container of claim 5, wherein the anti-corrosion layer is a plastic film or an aluminum foil.

* * * * *